Aug. 16, 1932.   O. BAUR   1,871,872
OIL PUMP
Filed Oct. 24, 1929
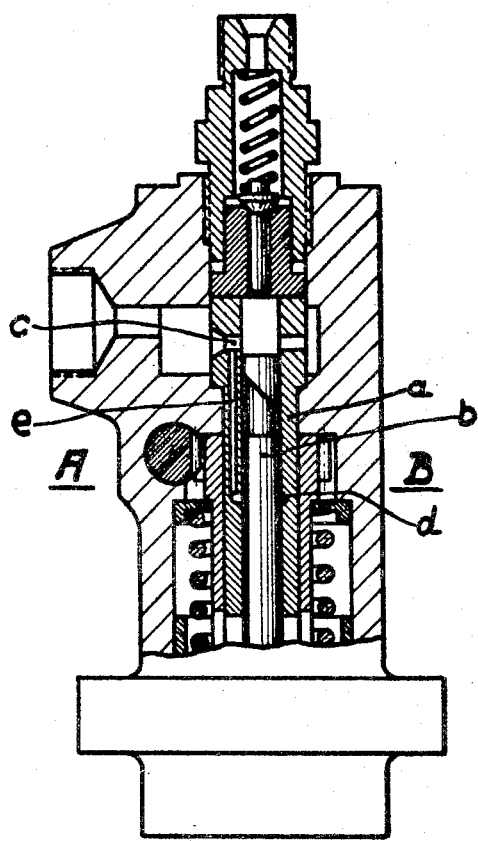
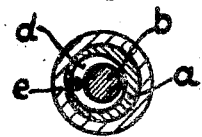
Inventor
Ottmar Baur
by Steward & McKay
his attorneys Patented Aug. 16, 1932

1,871,872

UNITED STATES PATENT OFFICE

OTTMAR BAUR, OF STUTTGART, GERMANY, ASSIGNOR TO ROBERT BOSCH AKTIENGE-SELLSCHAFT, OF STUTTGART, GERMANY

OIL PUMP

Application filed October 24, 1929, Serial No. 402,250, and in Germany December 10, 1928.

The present invention relates to oil pumps and more particularly to fuel pumps of internal combustion engines such as Diesel engines in which a piston or plunger reciprocates in a cylinder or sleeve and thereby controls a suction duct bored through the wall of the sleeve.

In order in such pumps to prevent the oil which leaks between the piston and the cylinder wall from escaping at the end of the cylinder or sleeve, an annular groove is according to this invention formed in the guide wall of the sleeve to receive the oil percolating between the piston and the cylinder wall, and this oil is then led back to the suction duct through a longitudinal duct in the sleeve connecting the suction duct with the annular groove.

One form of construction of the invention is shown in the accompanying drawing.

Figure 1 is a longitudinal section through the pump.

Figure 2 is a transverse section on A B of Figure 1.

A piston $b$ is fitted in a cylindrical sleeve $a$ and controls with its upper front edge a suction duct $c$ formed in the cylinder wall. In the drawing the piston is shown at the bottom of its stroke. A conduit $e$ in the sleeve wall connects an annular groove $d$ to the suction duct so that the fuel leaking past the piston is trapped in the groove $d$ and returned to the suction duct through the conduit $e$.

In this way, the leaking of oil from the end of the cylinder sleeve is avoided.

The annular groove $d$ is, as seen from Figure 2 formed eccentrically in the sleeve and in such a way that it is deepest, where the conduit opens into it. The cross sectional area of the cylinder sleeve at the groove is in this manner reduced as little as possible.

I claim:

An oil pump comprising a housing, a cylinder sleeve inserted therein, a piston fitted in said sleeve and adapted to reciprocate therein, said sleeve having a suction duct formed transversely through the walls thereof and being controlled by said piston, said sleeve also having a ring groove formed in the inner wall surface thereof to receive oil leaking between the piston and the sleeve, said ring groove being formed eccentrically with the axis of said sleeve, and a drain passage formed longitudinally in the wall of said sleeve and connecting the deepest part of said ring groove with the suction duct.

In testimony whereof I have hereunto affixed my signature.

OTTMAR BAUR.